United States Patent
Oshita et al.

(10) Patent No.: US 7,179,196 B2
(45) Date of Patent: Feb. 20, 2007

(54) INPUT TORQUE CONTROL SYSTEM OF BELT-TYPE CONTINUOUSLY VARIABLE TRANSMISSION FOR VEHICLE

(75) Inventors: Hideki Oshita, Fuji (JP); Hiroyasu Tanaka, Fuji (JP); Takuichiro Inoue, Fuji (JP); Masahiro Yamamoto, Fuji (JP); Kousuke Abe, Fuji (JP)

(73) Assignee: Jatco Ltd (JP)

( * ) Notice: Subject to any disclaimer, the term of this patent is extended or adjusted under 35 U.S.C. 154(b) by 142 days.

(21) Appl. No.: 11/092,037

(22) Filed: Mar. 29, 2005

(65) Prior Publication Data

US 2005/0221949 A1 Oct. 6, 2005

(30) Foreign Application Priority Data

Mar. 31, 2004 (JP) ............................. 2004-108200

(51) Int. Cl.
*F16H 61/662* (2006.01)
(52) U.S. Cl. ............................. 477/46; 477/44; 477/45; 477/50; 477/107; 477/110; 477/906
(58) Field of Classification Search ............... 477/44, 477/45, 46, 48, 49, 50, 107, 110, 906
See application file for complete search history.

(56) References Cited

U.S. PATENT DOCUMENTS 7,006,908 B2 * 2/2006 Kang et al. .................. 701/54
7,029,410 B2 * 4/2006 Sawada et al. ............... 474/28
2004/0133318 A1 * 7/2004 Kang et al. ................... 701/29
2004/0209719 A1 * 10/2004 Ochiai et al. ................. 474/18
2005/0192153 A1 * 9/2005 Jozaki et al. ................. 477/45

OTHER PUBLICATIONS

Specification and Claims of related co-pending U.S. Appl. No. 11/092,044.
Specification and Claims of related co-pending U.S. Appl. No. 11/092,537.

* cited by examiner

*Primary Examiner*—David D. Le
(74) *Attorney, Agent, or Firm*—Rossi, Kimms & McDowell LLP

(57) ABSTRACT

A transmission controller commands a demand torque of an engine to an engine controller according to an actual secondary pulley pressure that is detected by a secondary pulley pressure sensor when a vehicle speed is 0 km/h and a state wherein gear ratio is equal to or higher than a predetermined gear ratio is continued for a first predetermined time or more. Thereby, since an input torque corresponding to a secondary pulley pressure which is actually generated is inputted to a primary pulley even when a failure occurs in the secondary pulley rotation sensor, engine performance of a vehicle can be ensured.

4 Claims, 4 Drawing Sheets

INPUT TORQUE CONTROL SYSTEM OF BELT-TYPE CONTINUOUSLY VARIABLE TRANSMISSION FOR VEHICLE

BACKGROUND OF THE INVENTION

1. Field of the Invention

The present invention relates to an input torque control system of a belt-type continuously variable transmission for a vehicle which controls input torque which is inputted to the belt-type continuously variable transmission for the vehicle.

2. Description of the Prior Art

Conventionally, as an example of continuously variable transmissions suitable for a vehicle, there is a belt-type continuously variable transmission wherein a V-belt is wound between a primary pulley and a secondary pulley.

Generally, in these continuously variable transmissions, a hydraulic pressure (hereinafter, primary pulley pressure) obtained by regulating a line pressure as an original pressure with a shift control valve is supplied to a cylinder chamber of the primary pulley, and a hydraulic pressure (hereinafter, secondary pulley pressure) obtained by reducing the line pressure as the original pressure with a pressure reducing valve is supplied to a cylinder chamber of the secondary pulley. The primary pulley pressure is increased/reduced by the shift control valve to change the groove width of the primary pulley, and radius ratio of the primary pulley and the secondary pulley is changed, whereby gear ratio (reduction ratio) of the vehicle such as an automobile is continuously controlled.

Rotaion sensors detecting rotation speeds of the pulleys are respectively provided in the primary pulley and the secondary pulley, and an actual gear ratio of the belt-type continuously variable transmission is calculated by calculating a ratio of the rotation speeds detected by these rotation sensors.

When trouble such as breaking occurs in a secondary pulley rotation sensor detecting rotation speed of the secondary pulley, a gear ratio calculated on the basis of the rotation speeds detected by the rotation sensors is abnormally increased (changed to a low speed side).

In this case, since it cannot be determined whether the gear ratio has been abnormally increased due to a slip that occurs in the V-belt wound around the respective pulleys, or whether the gear ratio has been abnormally increased due to the failure of the secondary pulley rotation sensor, input torque to the belt-type continuously variable transmission is limited assuming that a slip has occurred in the V-belt due to short of the secondary pulley pressure.

Moreover, in this limitation of the input torque to the belt-type continuously variable transmission, a first input torque limitation according to the secondary pulley pressure is performed, and when the abnormal rise of the gear ratio continued for a predetermined time or more after the first limitation of the input torque, a second input torque limitation larger than the first input torque limitation is performed.

However, in the above conventional device, the first and second limitations of the input torque are performed even when the gear ratio is abnormally increased due to the failure of the secondary pulley rotation sensor, so that the input torque is limited even when a hydraulic system of the belt-type continuously variable transmission has no trouble and a sufficient hydraulic pressure can be supplied to respective pulleys, whereby driving performance of the vehicle is deteriorated.

SUMMARY OF THE INVENTION

The present invention has been made in view of the aforementioned problem, and its object is to provide a torque control system of a belt-type continuously variable transmission which is capable of ensuring driving performance of a vehicle even when a secondary pulley rotation sensor fails.

The present invention provides an input torque control system of a belt-type continuously variable transmission in which a belt is wound between a primary pulley to which an input torque is inputted and a secondary pulley of an output shaft side, and a primary pulley pressure and a secondary pulley pressure is respectively applied to the primary pulley and the secondary pulley so that an actual gear ratio of these pulleys that is obtained from rotation speed of the primary pulley detected by a primary pulley side rotation detecting section and rotation speed of the secondary pulley detected by a secondary pulley side rotation detecting section becomes a target gear ratio, comprising a secondary pulley pressure sensor for detecting the secondary pulley pressure that is supplied to the secondary pulley, an input torque control means for controlling the input torque that is inputted to the primary pulley, a vehicle speed detecting section for detecting a speed of a vehicle from a result detected by the secondary pulley side rotation detecting section, and a gear ratio calculating means for calculating the actual gear ratio from results detected by the primary pulley side rotation detecting section and the secondary pulley side rotation detecting section, wherein the input torque control means controls the input torque corresponding to the secondary pulley pressure detected by the secondary pulley pressure sensor when the vehicle speed detecting section detects that a speed of the vehicle is zero and the actual gear ratio calculated by the gear ratio calculating means is increased to a predetermined gear ratio or higher.

According to the present invention, when it is detected that speed of the vehicle is zero and the actual gear ratio is increased to the predetermined gear ratio or higer, the input torque is controlled according to the secondary pulley pressure actually generated.

Thereby, even when failure occurs in the secondary pulley side rotation sensor, the vehicle speed detecting section detects that the speed of the vehicle is zero, and the actual gear ratio calculated by the gear ratio calculating means is increased to the predetermined gear ratio or higher, the input torque corresponding to the secondary pulley pressure actually generated is inputted to the primary pulley, and the engine performance of the vehicle can be ensured.

The above and further objects and features of the invention will be more fully apparent from the following description when the same is considered with reference to the accompanying drawings.

DESCRIPTION OF THE PREFERRED EMBODIMENT

A preferred embodiment of the present invention will be described hereinbelow.

Figure 1:
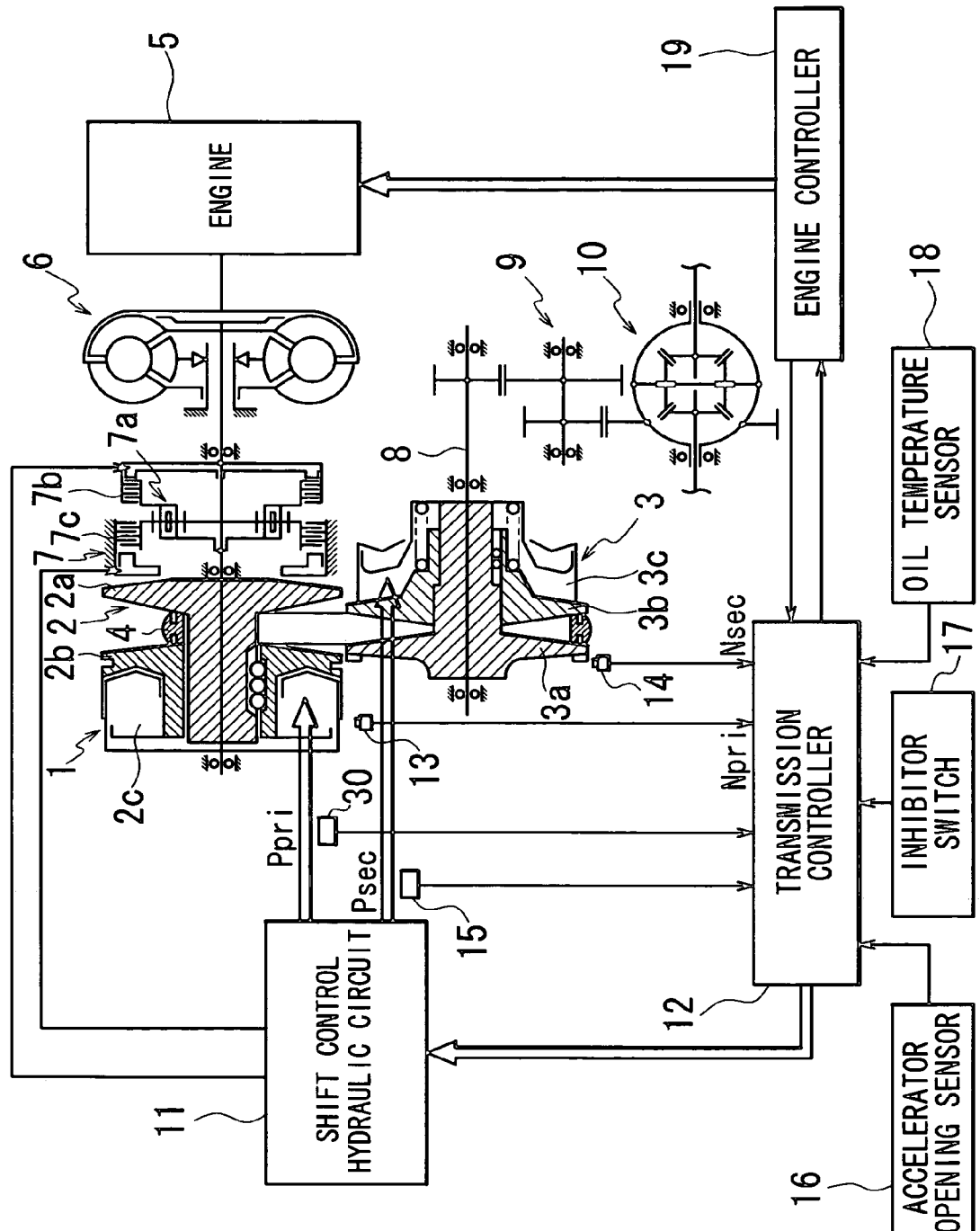
FIG. 1 is a view showing an embodiment according to the present invention.

FIG. 1 schematically shows a construction of a V-belt type continuously variable transmission.

A primary pulley 2 and a secondary pulley 3 are arranged so that their V-shaped grooves are aligned, and a V-belt 4 is wound around the V-shaped grooves of the pulleys 2, 3. An engine 5 that is a driving source is arranged coaxially with the primary pulley 2, and a torque converter 6 having a lockup mechanism and a forward/reverse switching mechanism 7 are sequentially provided between the engine 5 and the primary pulley 2. The torque converter 6, the forward/reverse switching mechanism 7, the primary pulley 2, the secondary pulley 3 and the V-belt 4 constitutes a V-belt type continuously variable transmission 1.

The forward/reverse switching mechanism 7 is comprised mainly of a double-pinion planetary gear mechanism 7a and includes a sun gear connected through the torque converter 6 to the engine 5 and a carrier connected to the primary pulley 2. The forward/reverse switching mechanism 7 has a forward clutch 7b directly connecting the sun gear and the carrier of the double-pinion planetary gear mechanism 7a and a backward brake 7c capable of fixing a ring gear, and transmits input rotation speed, which is transmitted through the torque converter 6 from the engine 5, to the primary pulley 2 when the forward clutch 7b is engaged. Further, when the backward brake 7c is engaged, the forward/reverse switching mechanism 7 reverses and reduces an input speed transmitted through the torque converter 6 from the engine 5 and transmits this input speed to the primary pulley 2.

Rotation of the primary pulley 2 is transmitted through the V-belt 4 to the secondary pulley 3, and then rotation of the secondary pulley 3 is transmitted through an output shaft 8, a gear set 9 and a differential gear 10 to not-shown wheels.

In order to make it possible to change a rotation transmission ratio (gear ratio) between the primary pulley 2 and the secondary pulley 3 during the above-mentioned power transmission, one of flanges defining the V-shaped grooves of the primary pulley 2 and the secondary pulley 3 is used as fixed flanges 2a, 3a, and other flanges 2b, 3b are used as movable flanges capable of being displaced in the axial direction. These movable flanges 2b, 3b are biased to the fixed flanges 2a, 3a by supplying a primary pulley pressure Ppri and a secondary pulley pressure Psec, which are obtained by using after-mentioned line pressure as an original pressure, to a primary pulley chamber 2c and a secondary pulley chamber 3c, whereby the V-belt 4 is frictionally engaged both between the fixed flange 2a and the movable flange 2b and between the fixed flange 3a and the movable flange 3b to enable the above-mentioned transmission of power between the primary pulley 2 and the secondary pulley 3.

This embodiment especially aims to miniaturize the size of V-belt type continuously variable transmission by equalizing a pressure receiving area of the primary pulley chamber 2c and that of the secondary pulley chamber 3c, thereby preventing one of the pulleys 2, 3 from having a larger diameter.

In a gear shift (speed change), differential pressure between the primary pulley pressure Ppri and the secondary pulley pressure Psec which are generated according to a target gear ratio changes width of the V-shaped grooves of the pulleys 2, 3, and a winding radius of the V-belt 4 with respect to these pulleys 2, 3 is continuously changed, whereby the target gear ratio can be realized.

Outputs of the primary pulley pressure Ppri and the secondary pulley pressure Psec are controlled by a shift control hydraulic circuit 11, together with outputs of engagement hydraulic pressures of the forward clutch 7b to be engaged when a forward running range is selected and the backward brake 7c to be engaged when a backward running range is selected. This shift control hydraulic circuit 11 performs this control in response to a signal from a transmission controller 12.

The transmission controller 12 receives a signal from a primary pulley rotation sensor 13 for detecting a primary pulley rotation speed Npri, a signal from a secondary pulley rotation sensor 14 for detecting a secondary pulley rotation speed Nsec, a signal from a secondary pulley pressure sensor 15 for detecting the secondary pulley pressure Psec, a signal from an accelerator opening sensor 16 for detecting an accelerator depression amount APO, a selected range signal from an inhibitor switch 17, a signal from an oil temperature sensor 18 for detecting a sift operation oil temperature TMP and signals concerning an engine torque information (engine speed, fuel injection time or output torque information of engine)from an engine controller 19 for controlling the engine 5.

Moreover, the transmission controller 12 receives a signal from a primary pulley pressure sensor 30 for detecting the primary pulley pressure Ppri.

Figure 2:
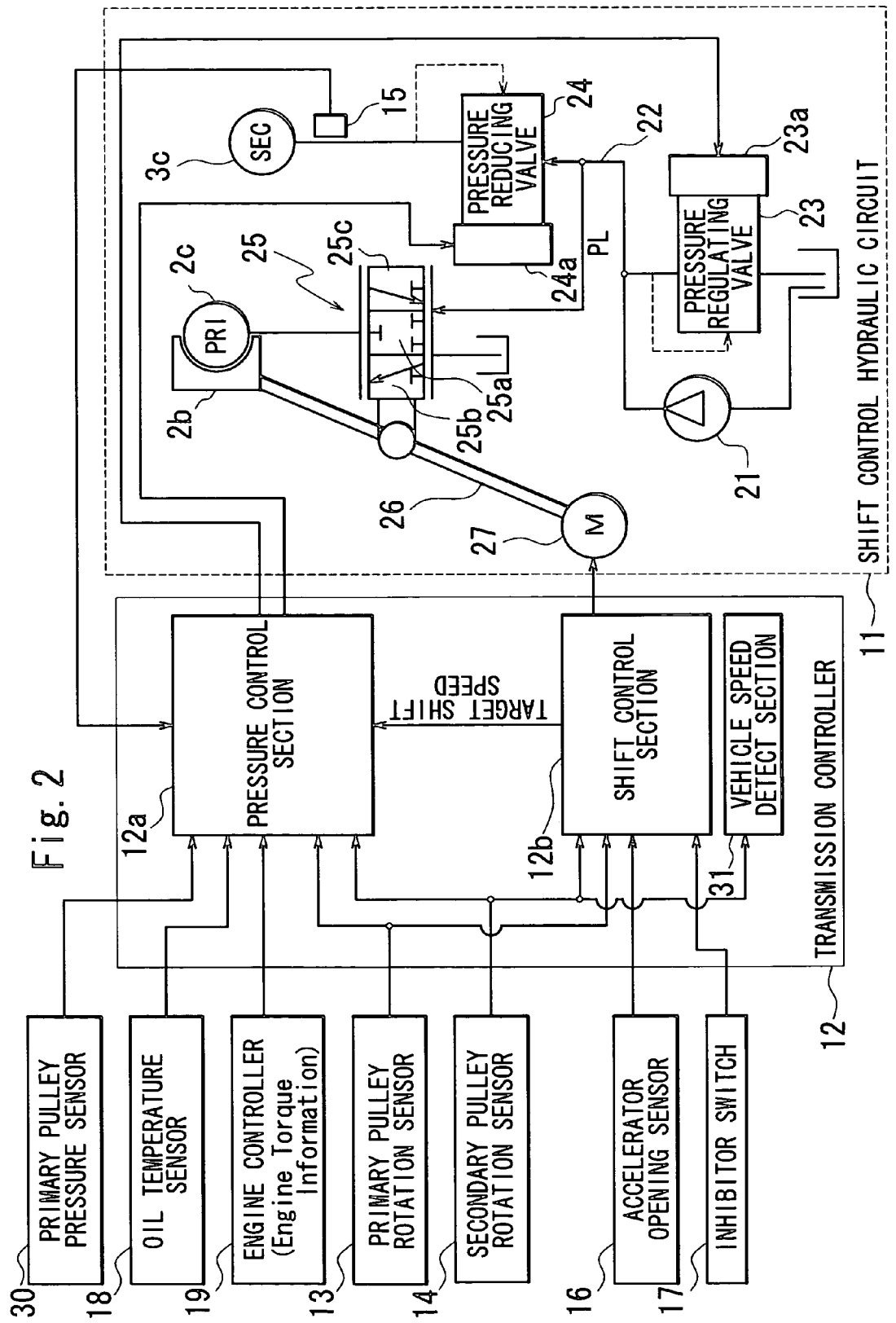
FIG. 2 is a view showing the detail of a shift control system of a V-belt type continuously variable transmission.

Next, controls performed in the shift control hydraulic circuit 11 and the transmission controller 12 will be explained with reference to FIG. 2.

The shift control hydraulic circuit 11 is provided with an oil pump 21 driven by the engine, employs working fluid supplied from the oil pump 21 to an oil passage 22 as medium and regulates the working fluid to a predetermined line pressure PL with a pressure regulator valve (P. Reg valve) 23. The line pressure PL of the oil passage 22 is regulated by a pressure reducing valve 24 and supplied to the secondary pulley chamber (SEC) 3c as the secondary pulley pressure Psec on the one hand, and is regulated by a shift control valve 25 and supplied to the primary pulley chamber (PRI) 2c as the primary pulley pressure Ppri on the other hand. The pressure regulator valve 23 controls the line pressure PL with a drive duty applied to a solenoid 23a, and the pressure reducing valve 24 controls the secondary pulley pressure Psec with a drive duty applied to a solenoid 24a.

The shift control valve 25 has a neutral position 25a, a pressure increasing position 25b and a pressure reducing position 25c. The shift control valve 25 is connected to the middle of a shift link 26 to switch these valve positions. A step motor (M) 27 as a shift actuator is connected to one end of the shift link 26, the other end of which is connected to the movable flange 2b of the primary pulley. The step motor 27 is driven to an operating position advancing from a reference position by the number of step corresponding to a target gear ratio, and this driving of the step motor 27 causes the shift link 26 to swing with a portion connected to the movable flange 2b as a pivoting point, thereby changing the shift control valve 25 from the neutral position 25a to the pressure increasing position 25b or the pressure reducing position 25c.

As a result, when the target gear ratio is set at a high speed side (upshift side), the line pressure PL is brought into communication with a primary pulley pressure Ppri side, and when the target gear ratio is set at a low speed side (downshift side), on the other hand, the primary pulley pressure Ppri is brought into communication with a drain side. Thereby, the primary pulley pressure Ppri is increased by using the line pressure PL as an original pressure or reduced by the drain to change differential pressure between the primary pulley pressure Ppri and the secondary pulley pressure Psec, so that an upshift to a Hi-side gear ratio or a downshift to a Lo-side gear ratio is established and thus, a shift operation toward the target gear ratio is performed.

Progress of the aforementioned gear shift is fed back to the shift link 26 through the movable flange 2b of the primary pulley, and the shift link 26 is swinged with the portion connecting with the step motor as a pivot point in a direction where the shift control valve 25 is returned from the pressure increasing position 25b or the pressure reducing position 25c to the neutral position 25a. Thereby, when the target gear ratio is achieved, the shift control valve 25 is returned to the neutral position 25a, and the target gear ratio can be maintained. When the pulley is placed at the lowest position Lo, capacity of transmission torque of the V-belt 4 can be retained since a not-shown mechanical stopper gives reaction force to the pulley regardless of presence or absence of the primary pulley pressure Ppri.

The transmission controller 12 determines a solenoid drive duty of the pressure regulator valve 23, a solenoid drive duty of the pressure reducing valve 24 and a shift command (step number) to the step motor 27, as well as controlling supply of engagement hydraulic pressure to the forward clutch 7b and the backward brake 7c which are shown in FIG. 1. This transmission controller 12 is constituted by a pressure control section 12a, a shift control section 12b and a vehicle speed detecting section 31 as shown in FIG. 2. The pressure control section 12a determines a solenoid drive duty of the pressure regulator valve 23 and a solenoid drive duty of the pressure reducing valve 24, and the shift control section 12b determines a drive step number Astep of the step motor 27 as described below.

The vehicle speed detecting section 31 first determines a vehicle speed from the secondary pulley rotation speed Nsec. Then, the shift control section 12b determines a target input speed on the basis of a predetermined shift map by using a vehicle speed determined and an accelerator pedal depression amount APO, and determines a target gear ratio corresponding to driving states (vehicle speed and accelerator pedal depression amount APO) by dividing the target input speed by the secondary pulley rotation speed Nsec.

Next, the shift control section 12b calculates an actual gear ratio (achieved gear ratio) by dividing the primary pulley rotation speed Npri by the secondary pulley rotation speed Nsec and determines a gear ratio command for gradually bringing the actual gear ratio close to the target gear ratio at a target shift speed while carrying out disturbance compensation according to a difference between the actual gear ratio and the target gear ratio. Then, the shift control section 12b determines a step number Asetp of the step motor 27, that is, an operating position of the step motor 27, for realizing this gear ratio command and transmits this step number to the step motor 27, whereby the target gear ratio can be achieved with the aforementioned shift operation.

Next, process which the transmission controller 12 performs at the time of abnormal rise of gear ratio will be described.

Figure 3:
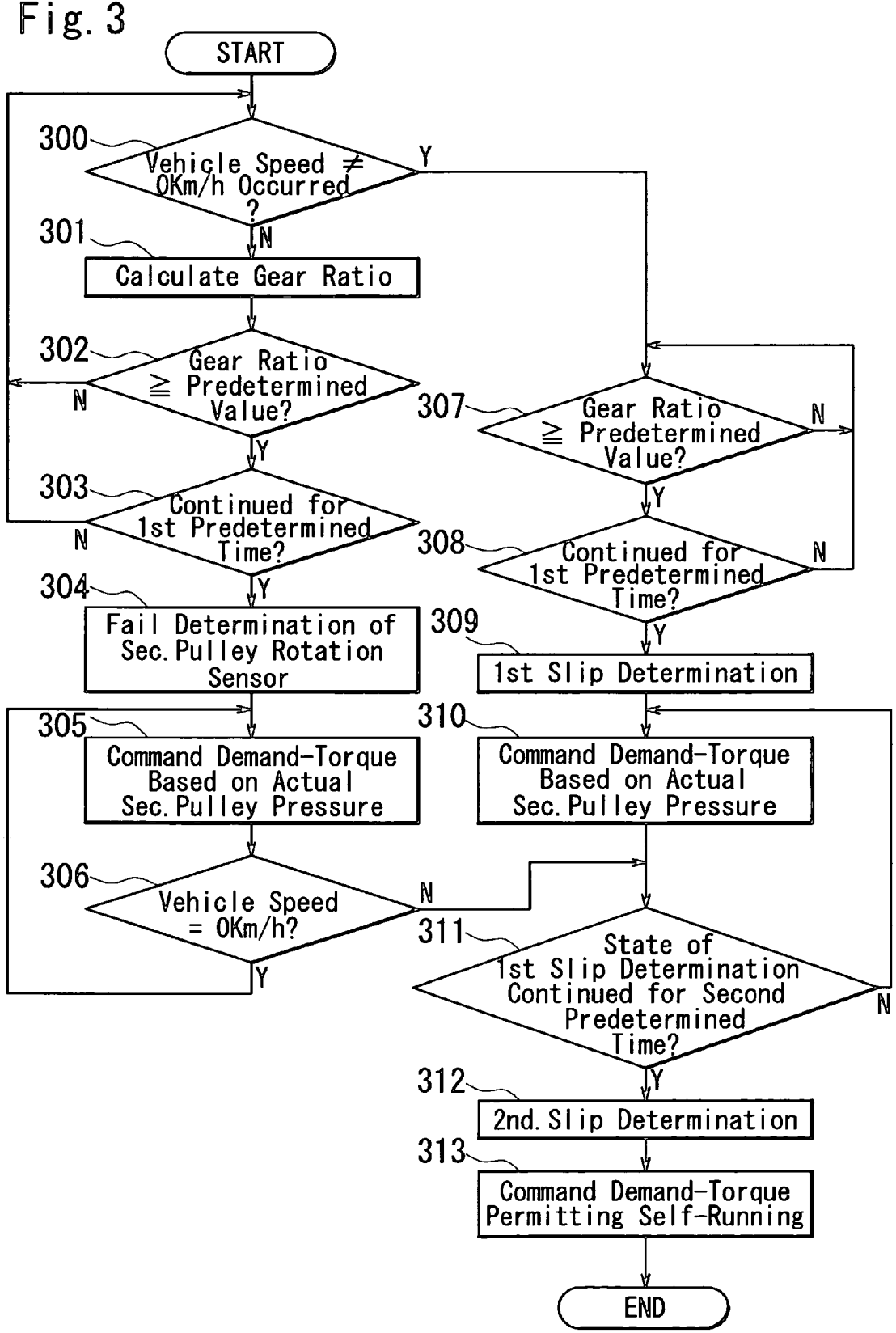
FIG. 3 is a flow chart showing a flow of a process which a transmission controller performs.
Figure 4:
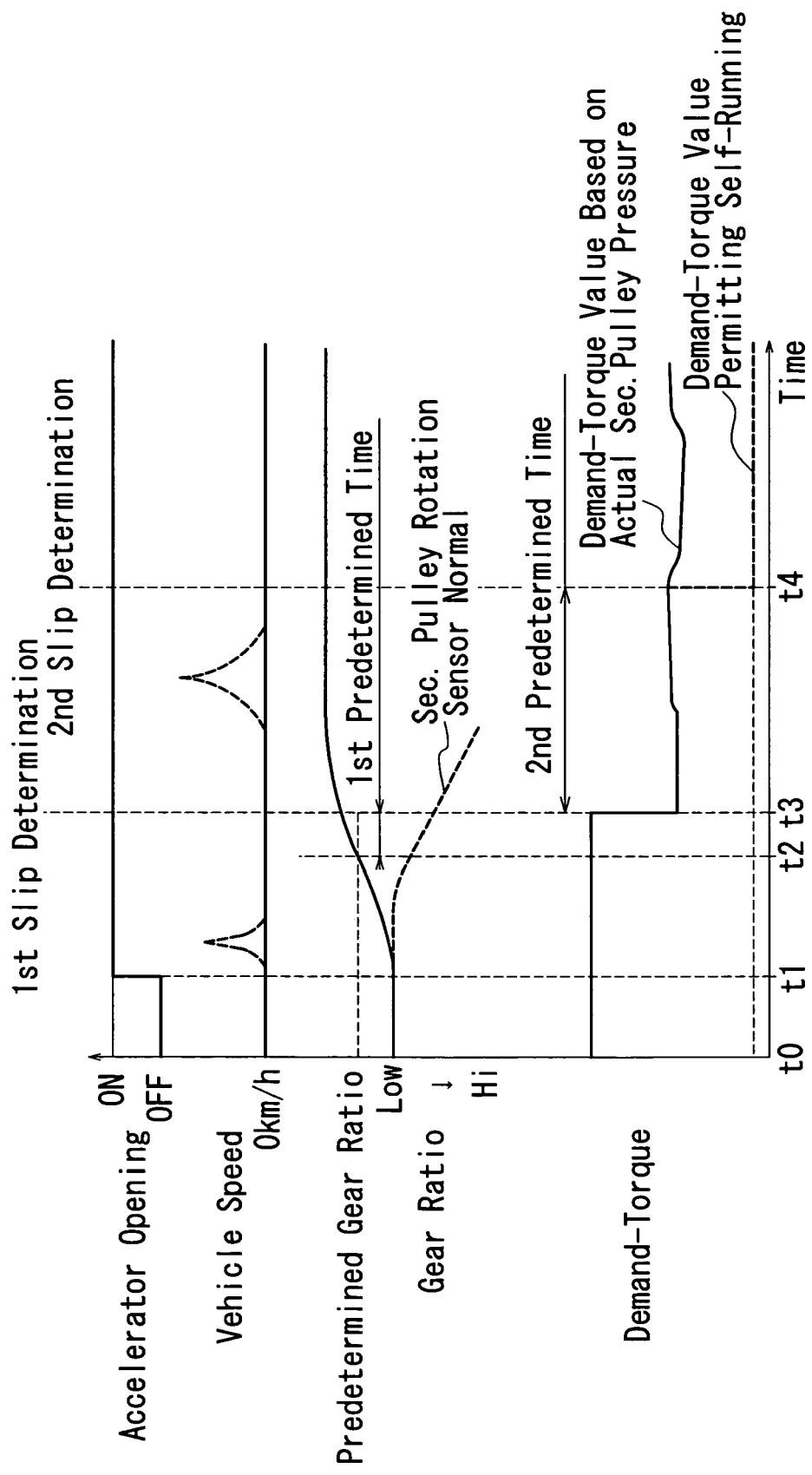
FIG. 4 is a time chart showing operation of each section.

FIG. 3 is a flow chart showing a flow of process which the transmission controller 12 performs, and FIG. 4 is a time chart showing operation of each section in this control.

This process is started when an ignition switch is turned on.

It is assumed that the accelerator is depressed by the driver at a time t1 after the ignition switch is turned on (time t0) as shown in FIG. 4.

When power from the engine is transmitted, and the primary pulley 2 starts to rotate, if the secondary pulley rotation sensor 14 fails or slip occurs in the V-belt 4, only the rotation speed of the primary pulley 2 is detected by the primary pulley rotation sensor 13.

Thereby, a gear ratio that is obtained by dividing rotation speed detected by the primary pulley rotation sensor 13 by rotation speed detected by the secondary pulley rotation sensor 14 is abnormally increased (changed to a low speed side (Low)) on and after the time t1 as shown by the solid line in FIG. 4.

In addition, when the secondary pulley rotation sensor 14 is normal, and no slip occurs in the V-belt, the gear ratio is reduced (changed to a high speed side (Hi)) as shown by the broken line in FIG. 4.

In a step 300, the transmission controller 12 determines whether the vehicle speed which can be obtained from the secondary pulley rotation speed Nsec has become other than 0 km/h after the ignition switch is turned on. If the vehicle speed has become other than 0 km/h (for example, such a vehicle speed is detected in a time period from the time t1 to t2 as shown by the broken line in FIG. 4), it is determined that the secondary pulley rotation sensor 14 is operating, and the routine proceeds to a step 307.

On the other hand, when the obtained vehicle speed is continued at 0 km/h, the routine proceeds to a step 301.

In the step 301, the vehicle speed detecting section 31 of the transmission controller 12 calculates a gear ratio of the vehicle from results detected by the primary pulley rotation sensor 13 and the secondary pulley rotation sensor 14.

In a step 302, the transmission controller 12 determines whether the gear ratio calculated is equal to or higher than a predetermined gear ratio.

If the gear ratio is abnormally increased to the predetermined gear ratio (time t2 in FIG. 4) or higher, the routine proceeds to a step 303.

On the other hand, if the gear ratio does not exceeds the predetermined gear ratio, the routine is returned to the step 300.

In the step 303, it is determined whether a state wherein the gear ratio is equal to or higher than the predetermined gear ratio is continued for a first predetermined time or more. When this state is continued for the first predetermined time or more (time t3 in FIG. 4), the routine proceeds to a step 304, and when this state is not continued for the first predetermined time or more, the routine is returned to the step 300, and the above process is repeated.

In the step 304, the transmission controller 12 determines that no slip occurs in the V-belt 4 and the secondary pulley rotation sensor 14 fails.

In a step 305, the transmission controller 12 determines that the shift control hydraulic circuit 11 generating hydraulic pressure that is supplied to each pulley is normal, and commands a demand torque value based on the actual secondary pulley pressure which is detected by the secondary pulley pressure sensor 15 to the engine controller 19 controlling the engine 5 on and after the time t3 in FIG. 4.

After the command of the demand torque value, in a step 306, the transmission controller 12 determines whether the vehicle speed is 0 km/h, and the process in the step 305 is repeated until the vehicle speed becomes other than 0 km/h.

On the other hand, when the vehicle speed becomes other than 0 km/h in a time period from the time t3 to t4 as shown by the broken line in FIG. 4, it is determined that the secondary pulley rotation sensor 14 is operating and slip occurs in the V-belt 4, and the routine proceeds to a step 311.

In this case, the failure determination of the secondary pulley rotation sensor made in the step 304 is assumed as a first slip determination, and the routine proceeds to the step 311.

In steps 307, 308, the transmission controller 12 determined whether the state wherein the gear ratio is equal to or higher than the predetermined gear ratio is continued for the first predetermined time or more as in the processes of the above steps 301, 302.

When the state wherein the gear ratio is equal to higher than the predetermined gear ratio is continued for the first predetermined time or more, in a step 309, the transmission controller 12 makes the first slip determination based on the detection of the vehicle speed, indicating that the secondary pulley rotation sensor 14 is normally operating and slip occurs in the V-belt 4, and the routine proceeds to a step 310.

In the step 310, the transmission controller 12 commands the demand torque value based on the actual secondary pulley pressure which is detected by the secondary pulley pressure sensor 15 to the engine controller 19 controlling the engine 5 on and after the time t3 in FIG. 4.

After the demand torque value is commanded or when it is determined that the vehicle speed becomes other than 0 km/h in the step 306, in a step 311, the transmission controller 12 determines whether the state of the first slip determination which is made in the step 309 or the step 304 is continued for a second predetermined time or more. When the state is continued for the second predetermined time or more, the routine proceeds to a step 312.

On the other hand, when the state is not continued for the second predetermined time or more or when the gear ratio is below the predetermined gear ratio, the routine is returned to the step 310 to perform the above process.

In a step 312, the transmission controller 12 makes a second slip determination indicating that slip of the V-belt 4 lasts for a long time (time t4 in FIG. 4).

In a step 313, the transmission controller 12 commands a demand torque permitting self-running of the vehicle to the engine controller 19 as shown by the broken line in FIG. 4 on and after the time t4 when the second slip determination is made.

Thereby, on and after the time t4, a low demand torque command value is commanded, input torque to the V-belt type continuously variable transmission is reduced, and thus, protection of the V-belt 4 is performed.

In this embodiment, the steps 305, 310, 313 constitute an input torque control means according to the present invention, and the step 301 constitutes a gear ratio calculating means according to the present invention.

This embodiment is thus constructed, and when the vehicle speed is 0 km/h and the state wherein the gear ratio is equal to or higher than the predetermined gear ratio is continued for the first predetermined time or more, the transmission controller 12 commands demand torque of the engine to the engine controller 19 according to the actual secondary pulley pressure detected by the secondary pulley pressure sensor 15.

Thereby, even when failure occurs in the secondary pulley rotation sensor 14, the input torque corresponding to the secondary pulley pressure which is actually generated is inputted to the primary pulley 2, whereby the engine performance of the vehicle can be ensured.

If the gear ratio is abnormally increased when it has been once detected that the vehicle speed is other than 0 km/h, the transmission controller 12 makes the first slip determination and commands the demand torque of the engine corresponding to the actually generated primary pulley pressure which is detected by the primary pulley pressure sensor 30. After that, when the abnormal rise of the gear ratio is continued, the transmission controller 12 makes the second slip determination and commands the demand torque permitting the self-running of the vehicle to the engine controller 19.

Thereby, when the secondary pulley rotation sensor 14 is functioning and slip is actually to occur in the V-belt 4, the input torque permitting the self-running of the vehicle is inputted to the primary pulley 2 on and after the second slip determination, and thus, the slip in the V-belt 4 can be prevented.

In addition, although rotation speed of the primary pulley 2 is detected by means of the primary pulley rotation sensor 13 in this embodiment, the rotation speed of the primary pulley 2 can be also obtained, for example, from speed of the output shaft of the torque converter 6.

Rotation speed of the secondary pulley 3 can be also detected by means other than the secondary pulley rotation sensor 14.

Thereby, for example, in the belt-type continuously variable transmission in which the rotation speed of the primary pulley is not detected by the primary pulley rotation sensor 13 but detected from the output shaft speed of the torque converter 6, the above-described hydraulic control can be performed without adding the primary pulley rotation sensor.

In addition, although direct control of output torque of the engine is described as an example, this torque limitation may be performed by limiting input torque inputted to the primary pulley. That is, this control may be performed by the torque converter which is disposed between the engine and the primary pulley, or the above torque limitation may be performed by mean of motor or clutch when they are disposed between the engine and the primary pulley.

What is claimed is:

1. An input torque control system of a belt-type continuously variable transmission in which a belt is wound between a primary pulley to which an input torque is inputted and a secondary pulley of an output shaft side, and a primary pulley pressure and a secondary pulley pressure is respectively applied to the primary pulley and the secondary pulley so that an actual gear ratio of these pulleys that is obtained from rotation speed of the primary pulley detected by a primary pulley side rotation detecting section and rotation speed of the secondary pulley detected by a secondary pulley side rotation detecting section becomes a target gear ratio, comprising:

a secondary pulley pressure sensor for detecting the secondary pulley pressure that is supplied to the secondary pulley;

an input torque control means for controlling the input torque that is inputted to the primary pulley;

a vehicle speed detecting section for detecting a speed of a vehicle from a result detected by the secondary pulley side rotation detecting section, and a gear ratio calculating means for calculating the actual gear ratio from results detected by the primary pulley side rotation detecting section and the secondary pulley side rotation detecting section, wherein the input torque control means controls the input torque according to the secondary pulley pressure detected by the secondary pulley pressure sensor when the vehicle speed detecting section detects that a speed of the vehicle is zero and the actual gear ratio calculated by the gear ratio calculating means is increased to a predetermined gear ratio or higher.

2. An input torque control system of a belt-type continuously variable transmission as claimed in claim 1, wherein the input torque control means controls the input torque at a lower value than a value of the input torque controlled according to the secondary pulley pressure when the vehicle speed detecting section detects that the speed of the vehicle is other than zero and that a state wherein the actual gear ratio calculated by the gear ratio calculating means is equal to or higher than the predetermined gear ratio is continued for a predetermined time or more.

3. An input torque control system of a belt-type continuously variable transmission as claimed in claim 1 or 2, wherein the primary pulley side rotation detecting section includes a primary pulley rotation sensor for directly detecting rotation of the primary pulley, or the secondary pulley side rotation detecting section includes a secondary pulley rotation sensor for directly detecting rotation of the secondary pulley.

4. An input torque control system of a belt-type continuously variable transmission as claimed in claims 1 or 2, wherein the input torque to the primary pulley is an output torque of an engine.

* * * * *

UNITED STATES PATENT AND TRADEMARK OFFICE
CERTIFICATE OF CORRECTION

PATENT NO. : 7,179,196 B2
APPLICATION NO. : 11/092037
DATED : February 20, 2007
INVENTOR(S) : Hideki Oshita et al.

It is certified that error appears in the above-identified patent and that said Letters Patent is hereby corrected as shown below:

On Title Page
Item (73) ASSIGNEE: the Assignee is typed incorrectly and should appear as follows:

--JATCO Ltd--

Signed and Sealed this

Seventeenth Day of April, 2007

JON W. DUDAS
*Director of the United States Patent and Trademark Office*